US012801366B2

(12) United States Patent
Ishikawa et al.

(10) Patent No.: US 12,801,366 B2
(45) Date of Patent: Nov. 17, 2026

(54) SYSTEM, CENTER, METHOD, AND NON-TRANSITORY STORAGE MEDIUM

(71) Applicant: TOYOTA JIDOSHA KABUSHIKI KAISHA, Toyota (JP)

(72) Inventors: Tomoyasu Ishikawa, Nagoya (JP); Shunsuke Tanimori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 120 days.

(21) Appl. No.: 17/808,656

(22) Filed: Jun. 24, 2022

(65) Prior Publication Data

US 2023/0033832 A1 Feb. 2, 2023

(30) Foreign Application Priority Data

Jul. 28, 2021 (JP) ................................ 2021-123581

(51) Int. Cl.
*G06F 8/65* (2018.01)
*B60W 50/14* (2020.01)
*G07C 5/00* (2006.01)

(52) U.S. Cl.
CPC ............... *G06F 8/65* (2013.01); *B60W 50/14* (2013.01); *G07C 5/008* (2013.01); *B60W 2050/146* (2013.01)

(58) Field of Classification Search
CPC ..... G06F 8/65; B60W 2050/146; G07C 5/008
See application file for complete search history.

(56) References Cited

U.S. PATENT DOCUMENTS

| | | | | |
|---|---|---|---|---|
| 2006/0047415 A1* | 3/2006 | Groskreutz | ......... | H04M 3/4878 455/12.1 |
| 2008/0244757 A1* | 10/2008 | Nakagaki | .............. | G06F 21/572 726/28 |
| 2013/0103230 A1* | 4/2013 | Suganuma | .............. | G06F 17/00 701/1 |

(Continued)

FOREIGN PATENT DOCUMENTS

| | | |
|---|---|---|
| JP | 2017-149323 A | 8/2017 |
| JP | 2020-27626 A | 2/2020 |

(Continued)

OTHER PUBLICATIONS

U.S. Appl. No. 17/839,948, filed Jun. 14, 2022; Tomoyasu Ishikawa, et al.

*Primary Examiner* — Wei Y Mui
*Assistant Examiner* — Brahim Bourzik
(74) *Attorney, Agent, or Firm* — Oblon, McClelland, Maier & Neustadt, L.L.P.

(57) ABSTRACT

A system includes a vehicle including an electronic control unit, a center configured to control software update for the electronic control unit, and an information terminal associated with the vehicle. The vehicle includes a display device, and one or more processors configured to communicate with the center. The center includes one or more processors. The one or more processors of the center are configured to transmit information related to the software update to the information terminal, transmit, to the vehicle, a notification that the information related to the software update has been transmitted to the information terminal, and cause the vehicle to display the notification received from the center on the display device.

7 Claims, 6 Drawing Sheets

(56) References Cited

U.S. PATENT DOCUMENTS

| | | | | |
|---|---|---|---|---|
| 2014/0310702 | A1* | 10/2014 | Ricci | G06F 3/013 717/173 |
| 2016/0117162 | A1* | 4/2016 | Searle | G06F 8/65 717/173 |
| 2018/0275983 | A1* | 9/2018 | Kwon | G06F 8/65 |
| 2018/0295010 | A1* | 10/2018 | Grobe | H04L 41/06 |
| 2018/0300472 | A1* | 10/2018 | Nakamura | H04W 12/06 |
| 2020/0174779 | A1* | 6/2020 | David | G06F 8/654 |
| 2020/0183676 | A1* | 6/2020 | Sakurai | H04L 67/34 |
| 2020/0249937 | A1* | 8/2020 | Teraoka | G06F 8/658 |
| 2020/0348923 | A1* | 11/2020 | Mezaael | G06F 8/658 |
| 2021/0011709 | A1* | 1/2021 | Itatsu | B60R 16/02 |
| 2021/0072968 | A1* | 3/2021 | Mezaael | G06F 8/65 |
| 2021/0149659 | A1* | 5/2021 | Abe | G06F 8/65 |
| 2024/0345826 | A1* | 10/2024 | Maruyama | H04W 4/48 |

FOREIGN PATENT DOCUMENTS

| | | | | |
|---|---|---|---|---|
| JP | 2020-132042 | A | | 8/2020 |
| JP | 2020-176974 | | | 10/2020 |
| JP | 2021105923 | A | * | 7/2021 |

* cited by examiner

SYSTEM, CENTER, METHOD, AND NON-TRANSITORY STORAGE MEDIUM

CROSS-REFERENCE TO RELATED APPLICATION

This application claims priority to Japanese Patent Application No. 2021-123581 filed on Jul. 28, 2021, incorporated herein by reference in its entirety.

BACKGROUND

1. Technical Field

The present disclosure relates to a system configured to control software update of an electronic control unit mounted on a vehicle, and also relates to a center, a method, and a non-transitory storage medium.

2. Description of Related Art

Vehicles include a plurality of electronic control units (ECUs) configured to control operations of the vehicles. The electronic control unit includes a processor, a transitory storage unit such as a random-access memory (RAM), and a non-volatile memory that is a non-volatile storage unit such as a flash read-only memory (ROM). The processor implements control functions of the electronic control unit by executing software stored in the non-volatile memory. The software stored in each electronic control unit is rewritable. Software update to a newer version of the software enables improvement in the functions of the electronic control unit and addition of new vehicle control functions.

An over-the-air (OTA) technology is known as a technology for updating software of electronic control units. In the OTA technology, a device that handles a software update process for a vehicle is wirelessly connected both to an in-vehicle communication device connected to an in-vehicle network and to a communication network such as the Internet. The device that handles the software update process downloads software from a server through wireless communication, writes and installs the downloaded software into the electronic control unit, and activates, that is, enables the installed software, thereby updating or adding the software for the electronic control unit. For example, reference may be made to Japanese Unexamined Patent Application Publication No. 2017-149323 (JP 2017-149323 A).

SUMMARY

When updating software by using the OTA technology, processes are performed to, for example, notify a user or administrator of the vehicle that there is software update, and request acceptance for the software update. The notification and the acceptance request are given to the user or administrator of the vehicle via an information terminal such as a car navigation device mounted on the vehicle or a smartphone wirelessly communicable with the vehicle.

The information terminal such as a smartphone can receive a large number of various electronic mails. In general, the owner of the information terminal selects only a necessary or reliable electronic mail from among the large number of electronic mails and checks the contents of the selected electronic mail. However, it may be cumbersome work for the owner of the information terminal to determine whether the electronic mail is really necessary and reliable based only on, for example, the title of the electronic mail or the sender's address. Therefore, there is a possibility that, when updating software by using the OTA, the user or administrator of the vehicle is unaware of the information transmitted to the information terminal of the user or administrator by electronic mail or the like or does not regard the information as necessary and reliable information.

The present disclosure provides a system, a center, a method, and a non-transitory storage medium in which, when updating software by using OTA, a user or administrator of the vehicle can be aware that information transmitted to an information terminal of the user or administrator by electronic mail or the like is reliable information.

A first aspect of the technology of the present disclosure relates to a system including a vehicle including an electronic control unit, a center configured to control software update for the electronic control unit, and an information terminal associated with the vehicle. The vehicle includes a display device, and one or more processors configured to communicate with the center. The center includes one or more processors. The one or more processors of the center are configured to communicate with the vehicle and the information terminal. The one or more processors of the center are configured to transmit information related to the software update to the information terminal. The one or more processors of the center are configured to, when the one or more processors of the center have transmitted the information related to the software update to the information terminal, transmit, to the vehicle, a notification that the information related to the software update has been transmitted to the information terminal. The one or more processors of the center are configured to cause the vehicle to display the notification received from the center on the display device.

In the system according to the first aspect of the technology of the present disclosure, the one or more processors of the center may be configured to transmit the information related to the software update to the information terminal when the information related to the software update is not displayable on the display device mounted on the vehicle.

In the system according to the first aspect of the technology of the present disclosure, the vehicle may further include a switch to be used for instructing the center to retransmit the information related to the software update to the information terminal.

In the system according to the first aspect of the technology of the present disclosure, the one or more processors of the center may be configured to control the software update based on an update acceptance notification received from the information terminal in response to the information related to the software update.

In the system according to the first aspect of the technology of the present disclosure, the one or more processors of the vehicle may be configured to transmit information related to the display device to the center. The one or more processors of the center may be configured to acquire the information related to the display device from the vehicle.

A second aspect of the technology of the present disclosure relates to a center configured to control software update for an electronic control unit mounted on a vehicle. The center includes one or more processors. The one or more processors are configured to communicate with the vehicle. The one or more processors are configured to communicate with an information terminal associated with the vehicle. The one or more processors are configured to transmit information related to the software update to the information terminal. The one or more processors are configured to, when the one or more processors have transmitted the information related to the software update to the information terminal, transmit, to the vehicle, a notification that the information related to the software update has been transmitted to the information terminal.

In the center according to the second aspect of the technology of the present disclosure, the one or more processors may be configured to acquire, from the vehicle, information related to a display device mounted on the vehicle. The one or more processors may be configured to transmit the information related to the software update to the information terminal when the information related to the software update is not displayable on the display device.

In the center according to the second aspect of the technology of the present disclosure, the one or more processors may be configured to retransmit the information related to the software update to the information terminal when the one or more processors receive a retransmission request from the vehicle.

In the center according to the second aspect of the technology of the present disclosure, the one or more processors may be configured to control the software update based on an update acceptance notification received from the information terminal in response to the information related to the software update.

A third aspect of the technology of the present disclosure relates to a method to be executed by a center configured to control software update for an electronic control unit mounted on a vehicle. The center includes one or more processors and a memory. The method includes transmitting information related to the software update to an information terminal associated with the vehicle, and when the center has transmitted the information related to the software update to the information terminal, transmitting, to the vehicle, a notification that the information related to the software update has been transmitted to the information terminal.

A fourth aspect of the technology of the present disclosure relates to a non-transitory storage medium storing instructions that are executable by one or more computers of a center and that cause the one or more computers to perform functions. The center includes one or more processors and a memory. The center is configured to control software update for an electronic control unit mounted on a vehicle. The functions include transmitting information related to the software update to an information terminal associated with the vehicle, and when the information related to the software update has been transmitted to the information terminal, transmitting, to the vehicle, a notification that the information related to the software update has been transmitted to the information terminal.

According to the system and the like of the present disclosure, when updating the software by using the OTA, the user or administrator of the vehicle can be aware that the information transmitted to the information terminal of the user or administrator by electronic mail or the like is reliable information.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

When information related to software update is not sufficiently displayable on a display device mounted on a vehicle at the time of updating software of an electronic control unit mounted on the vehicle, a system according to the present disclosure transmits the information related to the software update to an information terminal associated with the vehicle by electronic mail or the like, and transmits, to the vehicle, a notification that the information related to the software update has been transmitted to the information terminal. The vehicle causes the display device to display the notification received from the center and indicating that the information related to the software update has been transmitted. As a result, a user or administrator of the vehicle can be aware that the electronic mail or the like transmitted to his/her information terminal is reliable information by viewing the contents displayed on the display device.

An embodiment of the present disclosure will be described below in detail with reference to the drawings.

Embodiment

System Configuration

Figure 1:
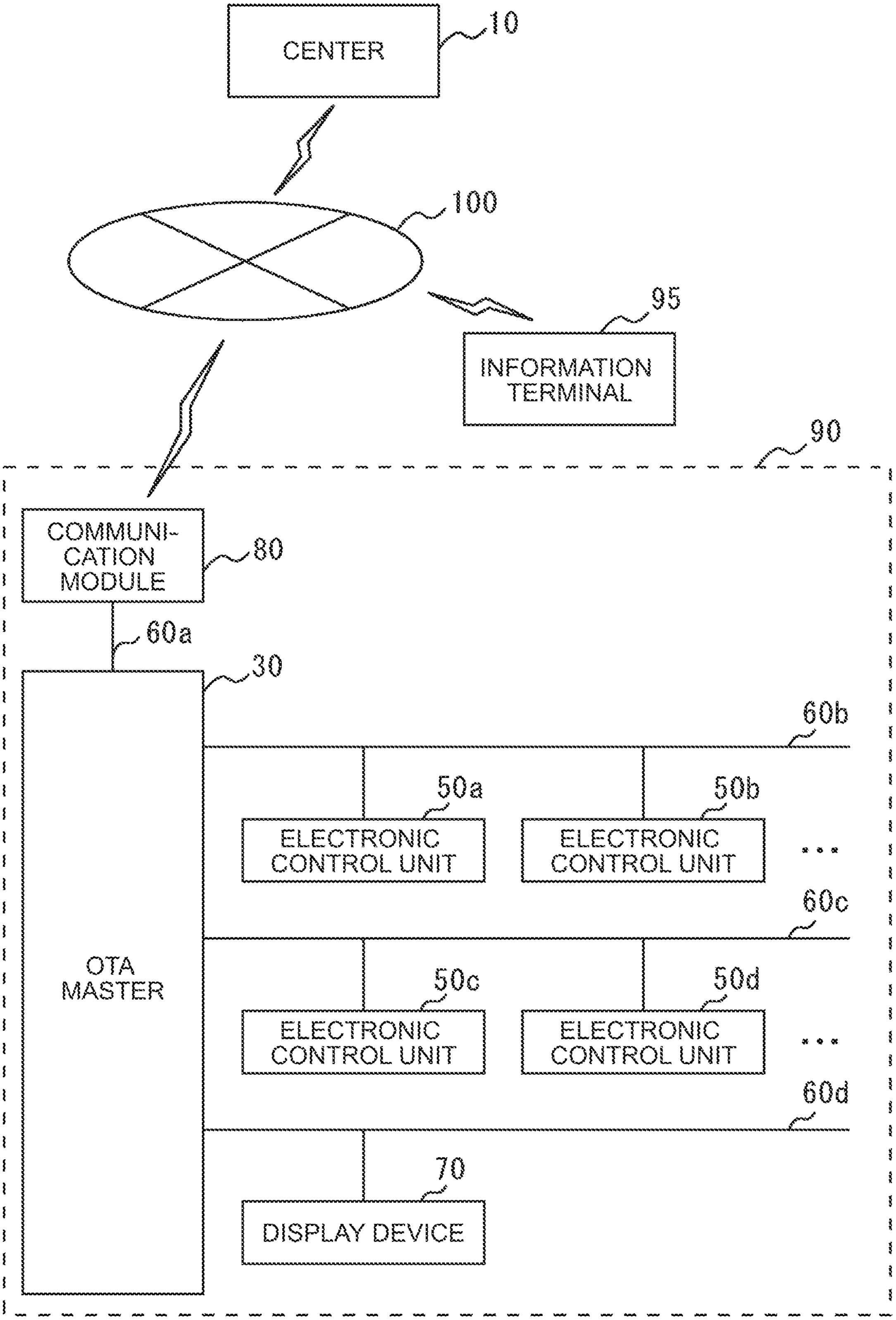
FIG. 1 is a block diagram showing an overall configuration of a network system according to an embodiment.

FIG. 1 is a block diagram showing an overall configuration of a network system according to the embodiment of the present disclosure. The network system illustrated in FIG. 1 is a system for updating software of at least one electronic control unit out of a plurality of electronic control units (ECUs) 50*a* to 50*d* mounted on a vehicle. The network system includes a center 10 outside the vehicle, an in-vehicle network 90 constructed inside the vehicle, an information terminal 95 associated with the vehicle, and a network 100.

(1) Center

The center 10 is communicable, via the network 100, with an OTA master 30 described later in the in-vehicle network 90. For example, the center 10 notifies, to a user or administrator of the vehicle, a notification that there is software update, transmits description about the software update, transmits software update data for the electronic control units 50*a* to 50*d* and information defining a procedure of a software update process, and receives a notification indicating the progress of the software update process. The center 10 can control and manage the software update of the electronic control units 50*a* to 50*d* connected to the OTA master 30. The center 10 has functions of a so-called server. The center 10 is communicable with the information terminal 95 via the network 100. For example, the center 10 can transmit, to the user or administrator of the vehicle, a notification that there is software update of the electronic control units 50*a* to 50*d* and description about the software update.

Figure 2:
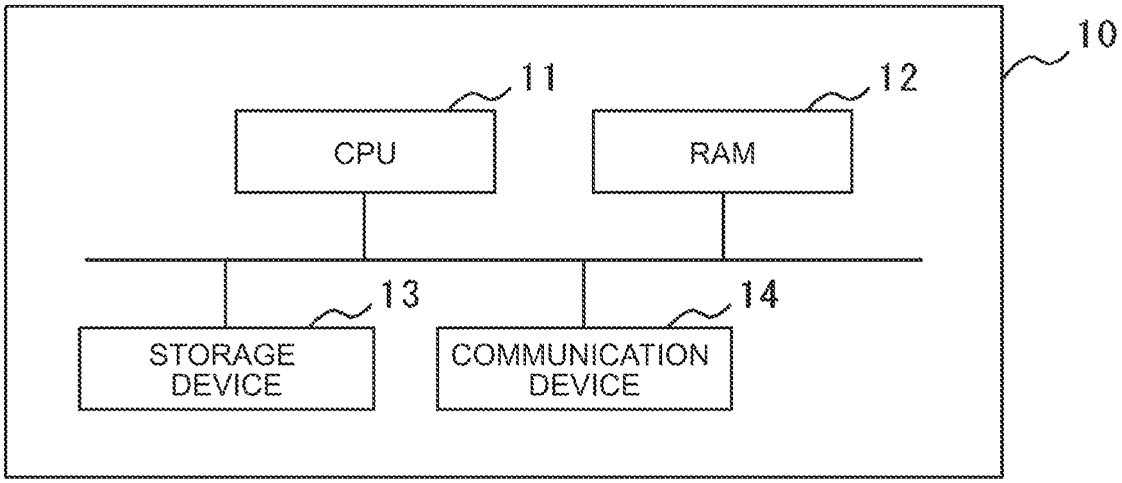
FIG. 2 is a block diagram showing a schematic configuration of a center.

FIG. 2 is a block diagram showing a schematic configuration of the center 10 in FIG. 1. As shown in FIG. 2, the center 10 includes a central processing unit (CPU) 11, a random-access memory (RAM) 12, a storage device 13, and a communication device 14. The storage device 13 includes a readable/writable storage medium such as a hard disk drive (HDD) or a solid state drive (SSD). For example, the storage device 13 stores programs for executing software update management, information to be used for software update control and software update management, and software update data of each electronic control unit. In the center 10, the CPU 11 executes the program read from the storage device 13 by using the RAM 12 as a work area to execute a predetermined process related to software update. The communication device 14 communicates with the OTA master 30 and the information terminal 95 via the network 100.

Figure 3:
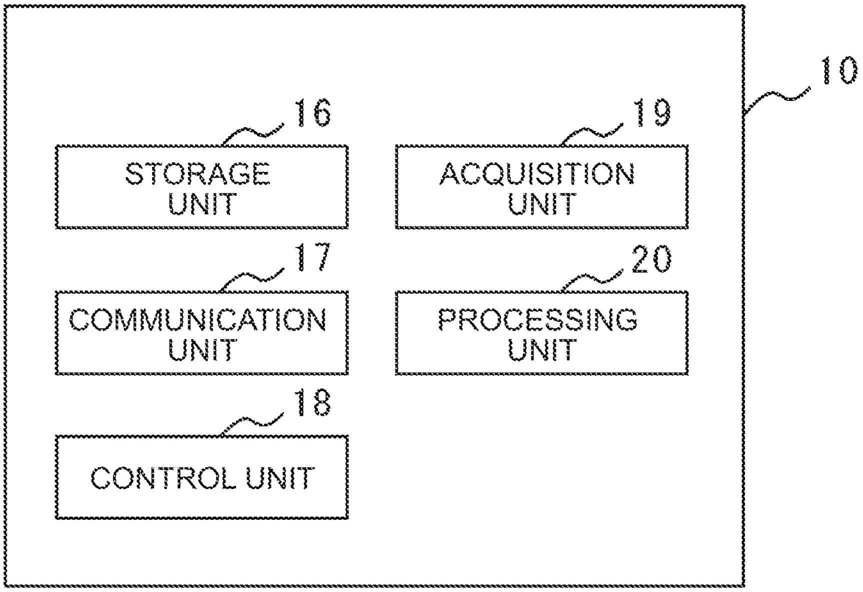
FIG. 3 is a functional block diagram of the center.

FIG. 3 is a functional block diagram of the center 10 shown in FIG. 2. The center 10 shown in FIG. 3 includes a storage unit 16, a communication unit 17, a control unit 18, an acquisition unit 19, and a processing unit 20. The storage unit 16 is implemented by the storage device 13 shown in FIG. 2. The communication unit 17, the control unit 18, the acquisition unit 19, and the processing unit 20 are implemented by the CPU 11 in FIG. 2 executing the programs stored in the storage device 13 by using the RAM 12.

The storage unit 16 stores information related to the software update process of one or more electronic control units mounted on the vehicle. As the information related to the software update process, the storage unit 16 stores at least update management information and software update data of the electronic control units 50*a* to 50*d*. The update management information is information in which information indicating software available for the electronic control units 50*a* to 50*d* is associated with vehicle identification information (vehicle ID) for identifying the vehicle. Examples of the information indicating software available for the electronic control units 50*a* to 50*d* include a combination of pieces of latest version information of software products of the electronic control units 50*a* to 50*d*. As the information related to the software update process, the storage unit 16 can also store a status of the software update being executed in the vehicle. As the information related to the software update process, the storage unit 16 can also store information related to an update sequence indicating a procedure of the software update process for a control instruction to be given to the OTA master 30. The storage unit 16 can also store information related to the display device 70 mounted on the vehicle that is acquired by the acquisition unit 19 described later.

The communication unit 17 functions as a transmission unit and a reception unit that transmit and receive data, information, notifications, requests, or the like to and from the OTA master 30 (vehicle) and the information terminal 95. The communication unit 17 receives a software update check request from the OTA master 30 (reception unit). For example, the update check request is information to be transmitted from the OTA master 30 to the center 10 when power supply or ignition is turned ON (hereinafter referred to as "powered ON") in the vehicle. The update check request is information for requesting the center 10 to check whether there is update data of the electronic control units 50*a* to 50*d* based on vehicle configuration information described later. In response to the update check request received from the OTA master 30, the communication unit 17 transmits information indicating the presence or absence of update data to the OTA master 30 (transmission unit). The communication unit 17 also receives a distribution package transmission request (download request) from the OTA master 30 (reception unit). When the distribution package download request is received (reception unit), the communication unit 17 transmits a distribution package to the OTA master 30 (transmission unit). The distribution package includes software update data for the electronic control units 50*a* to 50*d* that is generated by the control unit 18 described later. Based on an instruction of the processing unit 20, the communication unit 17 transmits, to the vehicle or the information terminal 95, a notification that there is software update, description about the software update, and an acceptance request for the software update (hereinafter referred to collectively as "information related to software update") for the user or administrator of the vehicle (transmission unit). The communication unit 17 can receive, from the vehicle, the information related to the display device 70 mounted on the vehicle or a request for retransmission of the information related to the software update (reception unit). The communication unit 17 is an example of "a second communication unit".

When the communication unit 17 receives the update check request from the OTA master 30, the control unit 18 determines whether there is software update data for the electronic control units 50*a* to 50*d* mounted on the vehicle identified by the vehicle ID included in the update check request based on the update management information stored in the storage unit 16. A result of the determination made by the control unit 18 as to whether there is update data is transmitted to the OTA master 30 by the communication unit 17. When the control unit 18 determines that there is software update data for the electronic control units 50*a* to 50*d* and receives a distribution package download request from the OTA master 30, the control unit 18 generates one or more distribution packages including the corresponding update data stored in the storage unit 16. The control unit 18 controls the software update process for the electronic control units 50*a* to 50*d* based on an update acceptance notification received from the information terminal 95, that is, from the user or administrator of the vehicle as a response to the information related to the software update that is transmitted by the processing unit 20.

The acquisition unit 19 acquires, from the vehicle via the communication unit 17, information related to the display device 70 mounted on the vehicle. The information related to the display device 70 includes at least information indicating whether information to be explained in advance to the user or administrator of the vehicle (for example, details of changes in control) is displayable on a screen of the display device 70 when updating software by using the OTA. The phrase "displayable on screen" typically means that all the information to be explained in advance can be presented to the user or administrator of the vehicle through the screen display. For example, the center 10 may acquire the information related to the display device 70 from the vehicle every time the vehicle is powered ON, or may acquire the information related to the display device 70 in advance by any other method.

When updating software by using the OTA, the processing unit 20 performs a process of transmitting information related to the software update based on the display device 70 mounted on the vehicle. More specifically, the processing unit 20 transmits the information related to the software update to the vehicle (OTA master 30) when the information to be explained in advance to the user or administrator of the vehicle is displayable on the screen of the display device 70 at the time of updating the software by using the OTA. The processing unit 20 transmits the information related to the software update to the information terminal 95 when the information to be explained in advance to the user or administrator of the vehicle is not displayable on the screen of the display device 70 at the time of updating the software by using the OTA. For example, the information related to the software update may be transmitted by an electronic mail that is transmitted by the center 10 via the communication unit 17, or by a cloud-type electronic mail. When the processing unit 20 transmits the information related to the software update to the information terminal 95, the processing unit 20 transmits, to the vehicle (OTA master 30), a notification that the information related to the software update has been transmitted to the information terminal 95. It is desirable that the contents of the notification that the information related to the software update has been transmitted to the information terminal 95 be displayable even on a simple display device 70. The processing unit 20 may transmit the notification that the information related to the software update has been transmitted to the information terminal 95 simultaneously with, prior to, or subsequently to the transmission of the information related to the software update to the information terminal 95. Thus, the processing unit 20 operates as a so-called human-machine interface (HMI) functional unit. Regarding the notification from the center 10 to the vehicle, the OTA master 30 may acquire the notification and control the display device 70 to display information based on the notification, or the display device 70 may directly receive the notification without intermediation of the OTA master 30 and display information based on the notification.

(2) Information Terminal

The information terminal 95 is a device such as a smartphone or a personal computer owned by the user or administrator of the vehicle. The information terminal 95 of the present embodiment has a function of receiving information related to software update that is transmitted by the center 10 or the like and allowing the user or administrator of the vehicle to view the contents of the information. The information terminal 95 can be associated with the vehicle by being registered and managed by the vehicle. The information terminal 95 functions as a human-machine interface (HMI) to be used for specific operations related to the vehicle (for example, locking and unlocking operations on vehicle doors and remote parking operation), information display, and the like. The number of information terminals 95 associated with the vehicle is not limited to one and may be plural.

(3) In-Vehicle Network

As shown in FIG. 1, the in-vehicle network 90 includes the OTA master 30, the electronic control units 50*a* to 50*d*, the display device 70, and a communication module 80. The OTA master 30 and the communication module 80 are connected via a bus 60*a*. The OTA master 30 and the electronic control units 50*a* and 50*b* are connected via a bus 60*b*. The OTA master 30 and the electronic control units 50*c* and 50*d* are connected via a bus 60*c*. The OTA master 30 and the display device 70 are connected via a bus 60*d*.

The OTA master 30 can wirelessly communicate with the center 10 via the bus 60*a*, the communication module 80, and the network 100. The OTA master 30 can also communicate with the electronic control units 50*a* to 50*d* and the display device 70 by wire via the buses 60*b* to 60*d*. The OTA master 30 manages an OTA status, controls an update sequence that is a flow of the software update process, and updates software of an electronic control unit to be updated (hereinafter referred to as "target electronic control unit"). The OTA master 30 controls the software update of the target electronic control unit among the electronic control units 50*a* to 50*d* based on, for example, the update data acquired from the center 10. The target electronic control unit is an electronic control unit that is a target of the software update. The OTA master 30 can cause the display device 70 to display an appropriate screen based on a notification and information related to the software update that are received from the center 10. The OTA master 30 may also be referred to as "central gateway (CGW)". One or more target electronic control units may function as the OTA master 30.

Figure 4:
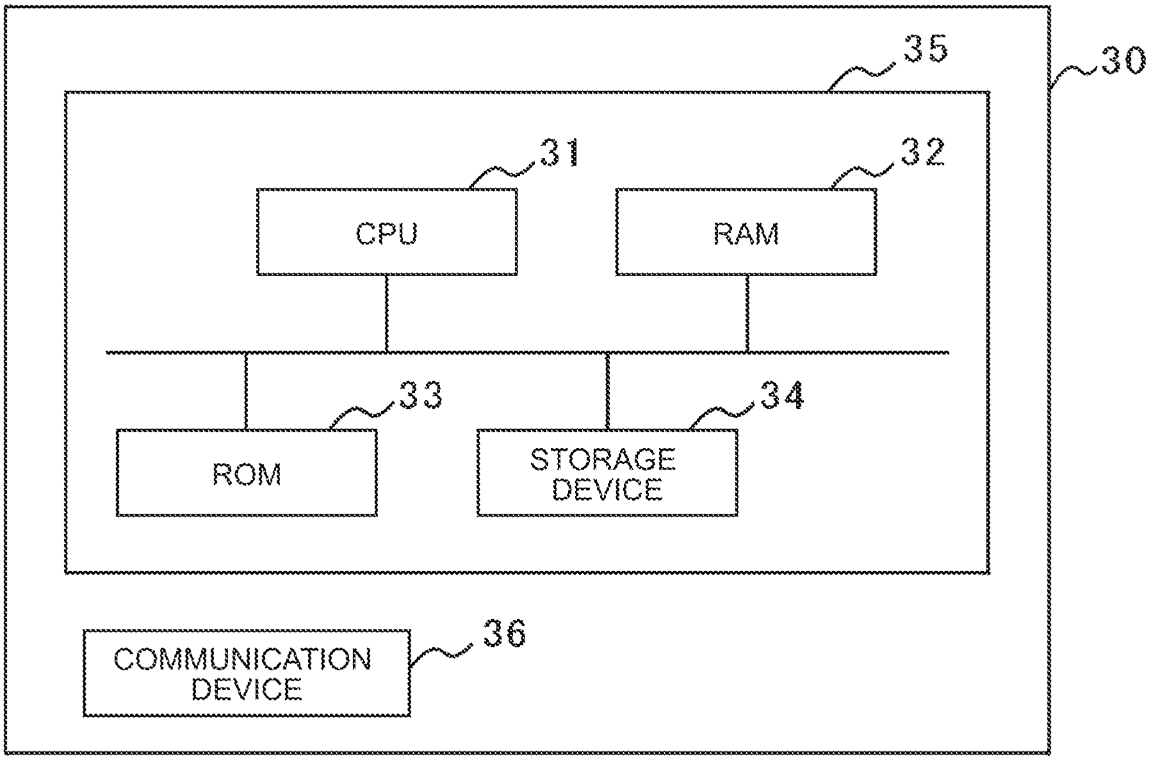
FIG. 4 is a block diagram showing a schematic configuration of an OTA master.

FIG. 4 is a block diagram showing a schematic configuration of the OTA master 30 in FIG. 1. As shown in FIG. 4, the OTA master 30 includes a CPU 31, a RAM 32, a read-only memory (ROM) 33, a storage device 34, and a communication device 36. The CPU 31, the RAM 32, the ROM 33, and the storage device 34 constitute a microcomputer 35. In the OTA master 30, the CPU 31 executes a program read from the ROM 33 by using the RAM 32 as a work area to execute a predetermined process related to software update. The communication device 36 communicates with the communication module 80, the electronic control units 50*a* to 50*d*, and the display device 70 via the buses 60*a* to 60*d* shown in FIG. 1.

Figure 5:
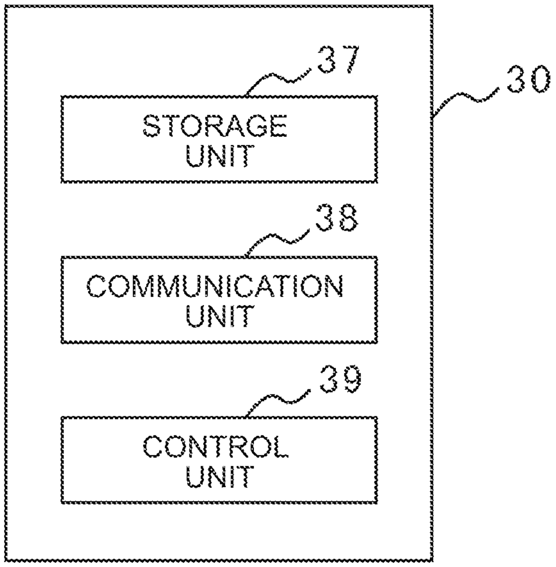
FIG. 5 is a functional block diagram of the OTA master.

FIG. 5 is a functional block diagram of the OTA master 30 shown in FIG. 4. The OTA master 30 shown in FIG. 5 includes a storage unit 37, a communication unit 38, and a control unit 39. The storage unit 37 is implemented by the storage device 34 shown in FIG. 4. The communication unit 38 and the control unit 39 are implemented by the CPU 31 in FIG. 4 executing programs stored in the ROM 33 by using the RAM 32.

The storage unit 37 stores, for example, a program for executing software update of the electronic control units 50*a* to 50*d* (control program for the OTA master 30), various types of data to be used when executing the software update, and software update data downloaded from the center 10. The storage unit 37 can also store information related to the type of a non-volatile memory mounted on each of the electronic control units 50*a* to 50*d*. The storage unit 37 can also store information related to the display device 70.

The communication unit 38 functions as a transmission unit and a reception unit that transmit and receive data, information, notifications, requests, or the like to and from the center 10. For example, the communication unit 38 transmits a software update check request to the center 10 when the vehicle is powered ON (transmission unit). For example, the update check request includes the vehicle ID for identifying the vehicle, and information related to current software versions of the electronic control units 50*a* to 50*d* connected to the in-vehicle network 90. The vehicle ID and the current software versions of the electronic control units 50*a* to 50*d* are used to determine whether there is software update data for the electronic control units 50*a* to 50*d* by making comparison with the latest software versions held in the center 10 for each vehicle ID. The communication unit 38 receives a notification about the presence or absence of update data from the center 10 as a response to the update check request (reception unit). When there is software update data for any one of the electronic control units 50*a* to 50*d*, the communication unit 38 transmits a download request for a distribution package including the software update data and the like to the center 10 (transmission unit). The communication unit 38 receives (downloads) the distribution package transmitted from the center 10 (reception unit). The communication unit 38 transmits, to the center 10, software update statuses received from the electronic control units 50_a_ to 50_d_ (transmission unit). The communication unit 38 can cause the display device 70 to display information related to the software update, a notification about transmission of the information, and a software update status based on an instruction from the control unit 39. The communication unit 38 can also transmit the information related to the display device 70 to the center 10 (transmission unit). The communication unit 38 is an example of "a first communication unit".

The control unit 39 determines whether there is software update data for any one of the electronic control units 50_a_ to 50_d_ based on the response to the update check request that is received from the center 10 by the communication unit 38. The control unit 39 verifies authenticity of the update data received (downloaded) in the form of the distribution package from the center 10 by the communication unit 38 and stored in the storage unit 37. The control unit 39 controls the software update process (installation, activation, or the like) of the electronic control units 50_a_ to 50_d_ by using the update data downloaded from the center 10. Specifically, the control unit 39 transfers the downloaded update data (update software) to the target electronic control unit, and causes the target electronic control unit to install the update software based on the update data. After the installation is completed, the control unit 39 instructs the target electronic control unit to activate, that is, enable the installed update software.

The electronic control units 50_a_ to 50_d_ are devices (ECUs) configured to control operations of individual parts of the vehicle. FIG. 1 shows an example in which the in-vehicle network 90 includes four electronic control units 50_a_ to 50_d_. The number of electronic control units is not limited to four. The number of buses connecting the electronic control units 50_a_ to 50_d_ to the OTA master 30 is not particularly limited as well.

The display device 70 is a human-machine interface (HMI) to be used for various types of display such as display of information indicating that there is update data during the software update process of the electronic control units 50_a_ to 50_d_, display of description about the software update, display of a notification that information related to the software update has been transmitted to the information terminal 95, display of an acceptance request screen for requesting acceptance of the user or administrator of the vehicle for the software update, and display of a result and status of the software update. A typical example of the display device 70 is a display device of a car navigation system. The display device 70 is not particularly limited as long as the display device 70 can display information necessary for the software update process. Examples of the display device 70 also include a simple HMI device such as a meter that cannot present the information related to the software update. Although the present embodiment is directed to the case where the display device 70 receives, via the OTA master 30, the information and notification transmitted from the center 10, the display device 70 may directly receive the information and notification from the communication module 80 without intermediation of the OTA master 30, or directly receive the information and notification from the center 10 via a communication device (not shown) other than the communication module 80. An electronic control unit or the like may further be connected to the bus 60_d_ shown in FIG. 1 in addition to the display device 70.

The communication module 80 is a unit having a function of controlling communication between the center 10 and the vehicle. The communication module 80 is a communication device for connecting the in-vehicle network 90 to the center 10. The communication module 80 is wirelessly connected to the center 10 via the network 100. For example, the OTA master 30 authenticates the vehicle and downloads update data via the communication module 80. The communication module 80 may be included in the OTA master 30.

The vehicle including the in-vehicle network 90 may include an input unit such as a switch (not shown) that can request the center 10 to retransmit the information related to the software update to the information terminal 95 (retransmission request). This switch is used when the user or administrator of the vehicle who recognizes the notification displayed on the screen of the display device 70 and indicating that the information related to the software update has been transmitted to the information terminal 95 wants to receive the information related to the software update on the information terminal 95 again. Therefore, it is preferable that the switch be provided, for example, near the display device 70 or on a steering wheel. The switch may be displayed on the display device 70. The information terminal 95 may directly request the retransmission of the information related to the software update. In this way, the information transmitted in response to an action taken by the user or administrator can give a sense of reliability to the user or administrator.

Overview of Software Update Process

For example, the OTA master 30 transmits a software update check request to the center 10 when the vehicle is powered ON. The update check request includes the vehicle ID for identifying the vehicle, and the vehicle configuration information. The vehicle configuration information is information related to conditions of the electronic control units (system configuration), such as hardware and current software versions of the electronic control units 50_a_ to 50_d_ connected to the in-vehicle network 90. The vehicle configuration information can be created by acquiring identification numbers of the electronic control units (ECU_IDs) and identification numbers of the software versions of the electronic control units (ECU_Software_IDs) from the electronic control units 50_a_ to 50_d_ connected to the in-vehicle network 90. The vehicle ID and the current software versions of the electronic control units 50_a_ to 50_d_ are used to determine whether there is software update data for the electronic control units 50_a_ to 50_d_ by making comparison with the latest software versions held in the center 10 for each vehicle ID. In response to the update check request received from the OTA master 30, the center 10 transmits, for example, a notification about the presence or absence of update data and information related to the software update to the OTA master 30 and/or the information terminal 95. When there is software update data for the electronic control units 50_a_ to 50_d_, the OTA master 30 transmits a distribution package download request to the center 10. In response to the download request received from the OTA master 30, the center 10 transmits a distribution package including the update data and the like to the OTA master 30. The distribution package may include, in addition to the update data, verification data for verifying the authenticity of the update data, the number of pieces of the update data, type information, and various types of control information to be used during the software update.

The OTA master 30 determines whether there is software update data for the electronic control units 50_a_ to 50_d_ based on the response to the update check request that is received from the center 10. The OTA master 30 verifies the authenticity of the distribution package received from the center 10 and stored in the storage device 34. The OTA master 30 transfers the update data downloaded in the distribution package to the target electronic control unit. The OTA master 30 causes the target electronic control unit to install update software. After the installation is completed, the OTA master 30 instructs the target electronic control unit to activate, that is, enable the installed updated version of software.

In an acceptance request process, the center 10 causes an output device to output information for describing software update, a notification that acceptance is required for the software update, and a notification that prompts the user to input acceptance for the software update. Examples of the output device include the display device 70 provided in the in-vehicle network 90 and the information terminal 95. For example, the display device 70 is used as the output device in the acceptance request process when information to be explained in advance to the user or administrator of the vehicle is displayable on the screen of the display device 70. When the display device 70 is used as the output device, the OTA master 30 is capable of causing the display device 70 to display, for example, information related to the software update, an acceptance request screen for requesting acceptance of the user or administrator for the software update, and a notification that prompts the user or administrator to perform a specific input operation such as pressing of an acceptance button when the user or administrator accepts the software update. The information terminal 95 is used as the output device in the acceptance request process when the information to be explained in advance to the user or administrator of the vehicle is not displayable on the screen of the display device 70. When the information terminal 95 is used as the output device, a display screen of the information terminal 95 can display (by the center 10), for example, the information related to the software update, the acceptance request for acceptance of the user or administrator for the software update, and the notification that prompts the user or administrator to perform the specific input operation such as pressing of the acceptance button when the user or administrator accepts the software update. In response to reception of the input of acceptance from the user or administrator via the OTA master 30 and/or the information terminal 95, the center 10 instructs the OTA master 30 to execute a control process for the installation and activation to update the software of the target electronic control unit.

When the non-volatile memory of the target electronic control unit is a single-bank memory having one storage area for storing data of software or the like, the installation and activation are basically executed in succession. Therefore, the acceptance request process for the software update is executed before the installation. Even when the non-volatile memory of the target electronic control unit is the single-bank memory, the target electronic control unit may be requested to temporarily stop the update process, that is, to hold (wait for) the activation after completion of the installation depending on information related to an update sequence under instruction from the center 10. When the non-volatile memory of the target electronic control unit is a dual-bank memory having two storage areas for storing data of software or the like, the acceptance request process for the software update is executed at least after the installation and before the activation. When the non-volatile memory of the target electronic control unit is the dual-bank memory, the acceptance request process for the software update before the installation may be executed or omitted.

The software update process includes a download phase, an installation phase, and an activation phase. In the download phase, the OTA master 30 downloads update data from the center 10. In the installation phase, the OTA master 30 transfers (transmits) the downloaded update data (update software) to the target electronic control unit and installs the update software based on the update data in the storage area of the target electronic control unit. In the activation phase, the target electronic control unit enables the installed update software.

Download is a process in which the OTA master 30 receives the update data for updating the software of the electronic control unit and stores the update data in the storage unit 37. The update data is included in a distribution package and transmitted from the center 10 to the OTA master 30. The download phase includes not only the execution of download, but also control of a series of processes related to the download, such as determination of whether the download can be executed, and verification of the updated data.

The update data transmitted from the center 10 to the OTA master 30 may include update software for the electronic control units (whole data or difference data), compressed data of the update software, or divided data of the update software or the compressed data. The update data may include an ECU_ID (or serial number) of the target electronic control unit and an ECU_Software_ID of the target electronic control unit before update. The update data is downloaded as the distribution package. The distribution package includes update data for one or more electronic control units.

Installation is a process in which the OTA master 30 writes the update software (updated version program) to the non-volatile memory of the target electronic control unit based on the update data downloaded from the center 10. The installation phase includes not only the execution of installation, but also control of a series of processes related to the installation, such as determination of whether the installation can be executed, transfer of the update data, and verification of the update software.

When the update data includes the update software (whole data), the OTA master 30 transfers the update data (update software) to the target electronic control unit in the installation phase. When the update data includes compressed data, difference data, or divided data of the update software, the OTA master 30 may transfer the update data to the target electronic control unit, and the target electronic control unit may generate the update software from the update data. Alternatively, the OTA master 30 may generate the update software from the update data and then transfer the update software to the target electronic control unit. The update software can be generated by decompressing the compressed data or assembling (integrating) the difference data or the divided data.

The update software can be installed by the target electronic control unit based on an installation request from the OTA master 30. A specific target electronic control unit that has received the update data may autonomously install the update software without receiving an explicit instruction from the OTA master 30.

Activation is a process in which the target electronic control unit enables (activates) the update software installed in the non-volatile memory. The activation phase includes not only the execution of activation, but also a series of controls related to the activation, such as determination of whether the activation can be executed, request for acceptance of the user or administrator of the vehicle for the activation, and verification of an execution result.

The update software can be activated by the target electronic control unit based on an activation request from the OTA master 30. A specific target electronic control unit that has received the update data may autonomously execute the activation after completion of the installation without receiving an explicit instruction from the OTA master 30.

The software update process can be executed successively or in parallel for a plurality of target electronic control units.

The "software update process" herein includes not only a process of successively executing all of the download, installation, and activation, but also a process of executing only a part of the download, installation, and activation.

Processes

Next, the software update process to be executed in the network system according to the present embodiment will be described with reference to FIGS. 6A, 6B, and 7 as well.

Figure 6A:
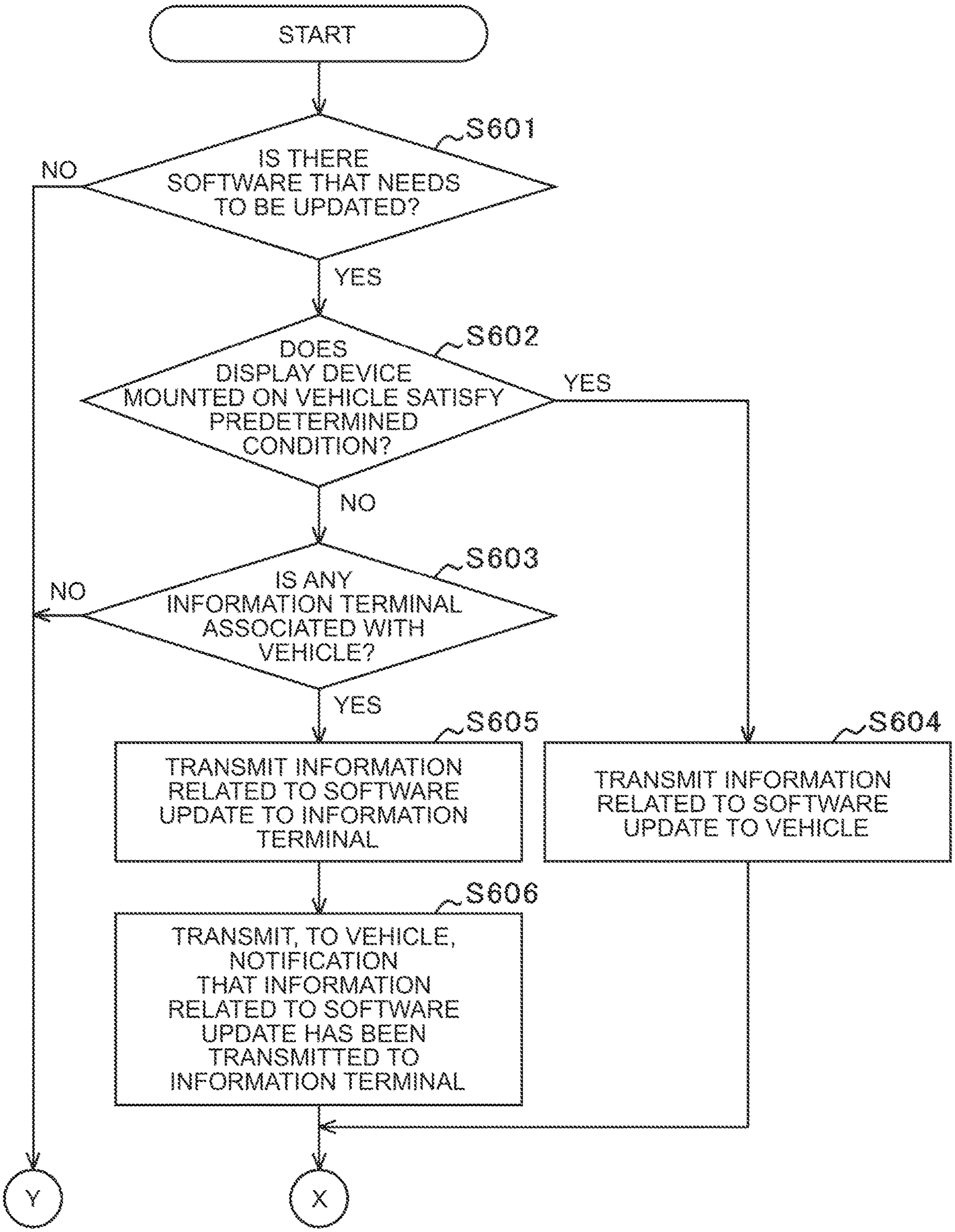
FIG. 6A is a flowchart of a process to be executed by the center for transmitting information related to software update.
Figure 6B:
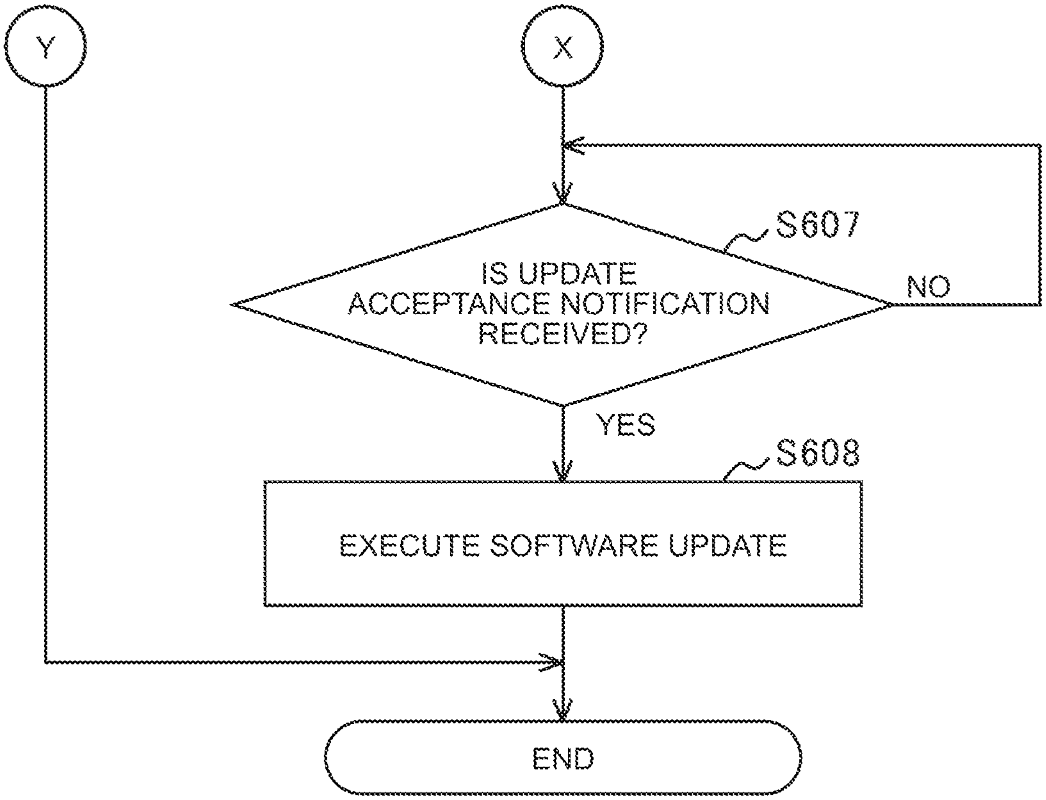
FIG. 6B is a flowchart of the process to be executed by the center for transmitting the information related to the software update.

FIGS. 6A and 6B are flowcharts illustrating a procedure of a process to be executed by the center 10 for transmitting information related to software update. The process of FIG. 6A and the process of FIG. 6B are connected by connectors X and Y.

Step S601

The center 10 determines whether there is software that needs to be updated in the vehicle. The center 10 can make this determination based on current software versions of the electronic control units 50*a* to 50*d* on the vehicle that are acquired from the vehicle configuration information in the update check request transmitted from the OTA master 30 and the latest software versions stored in the storage unit 16 of the center 10. When the center 10 determines that there is software that needs to be updated in the target vehicle (Step S601: YES), the process proceeds to Step S602. When the center 10 determines that there is no software that needs to be updated in the target vehicle (Step S601: NO), this process is terminated.

Step S602

The center 10 determines whether the display device 70 mounted on the vehicle that is the target of the software update satisfies a predetermined condition. The predetermined condition is a condition that information to be explained in advance to the user or administrator of the vehicle (for example, details of changes in control) is displayable on the screen of the display device 70 when updating the software by using the OTA. The center 10 makes this determination based on the information related to the display device 70 that is acquired by the acquisition unit 19. When the center 10 determines that the display device 70 satisfies the predetermined condition (Step S602: YES), the process proceeds to Step S604. When the center 10 determines that the display device 70 does not satisfy the predetermined condition (Step S602: NO), the process proceeds to Step S603.

Step S603

The center 10 determines whether there is an information terminal 95 associated with the vehicle that is the target of the software update. For example, the information terminal 95 associated with the vehicle is generally preregistered in a storage unit of the vehicle or in an external management facility that manages the vehicle. Therefore, the center 10 can make this determination based on the registered information. When the center 10 determines that there is the information terminal 95 associated with the vehicle (Step S603: YES), the process proceeds to Step S605. When the center 10 determines that there is no information terminal 95 associated with the vehicle (Step S603: NO), this process is terminated without performing the software update process.

Step S604

The center 10 transmits information related to the software update (description about details of the software update, acceptance request for the software update, and the like) to the vehicle (OTA master 30). In the vehicle that has received this information, the display device 70 displays a screen based on the information related to the software update. When the information related to the software update is transmitted to the vehicle, the process proceeds to Step S607.

Step S605

The center 10 transmits the information related to the software update (description about details of the software update, acceptance request for the software update, and the like) to the information terminal 95. When determination is made in Step S603 that there are a plurality of information terminals 95 associated with the vehicle, the center 10 may transmit the information to all the terminals or to a part of the terminals (for example, one terminal closest to the vehicle). The information terminal 95 that has received this information displays a screen based on the information related to the software update. In addition to the display of the contents of the information in a text format, various formats can be used on the screen, such as an address of a link to a web page showing the contents of the information, and a start button of an application that can present the contents of the information. When the information related to the software update is transmitted to the information terminal 95, the process proceeds to Step S606.

Step S606

The center 10 transmits, to the vehicle (OTA master 30), a notification that the information related to the software update has been transmitted to the information terminal 95. This notification has a smaller amount of information than that of the information related to the software update, and the contents of the notification can be displayed even by a simple HMI device such as a meter that cannot present the information related to the software update. Examples of the notification include a message including texts with which the event originating from the vehicle (OTA master 30) can be identified. With such a notification, there is a strong probability that the user or administrator of the vehicle will be aware of the information related to the software update that is received by the information terminal 95 by electronic mail or the like in Step S605. Further, there is a strong possibility that the user or administrator of the vehicle will determine that the information related to the software update that is received by the information terminal 95 by electronic mail or the like in Step S605 is reliable and important information. When the notification that the information related to the software update has been transmitted to the information terminal 95 is transmitted to the vehicle, the process proceeds to Step S607. Steps S605 and S606 may be performed at the same time.

Step S607

The center 10 determines whether an update acceptance notification is received from the vehicle (OTA master 30) or the information terminal 95 as a response to the information related to the software update. By receiving the update acceptance notification, the center 10 can determine that the user or administrator of the vehicle agrees with the update while understanding the details of the software update. When the center 10 determines that the update acceptance notification is received from the vehicle (OTA master 30) or the information terminal 95 (Step S607: YES), the process proceeds to Step S608. When the center 10 determines that the update acceptance notification is not received (Step S607: NO), the process repeats Step S607 (the center 10 waits for the update acceptance notification). When the center 10 cannot receive the update acceptance notification from the vehicle (OTA master 30) or the information terminal 95 for a predetermined period continuously, this process may be terminated without performing the software update process.

Step S608

The center 10 executes a process for updating the software of the target electronic control unit mounted on the vehicle (download, installation, and activation). Thus, the process for transmitting the information related to the software update is completed. In the present embodiment, the destination of the transmission of the information related to the software update is determined based on whether the display device 70 satisfies the predetermined condition as in Step S602. Determination may be made in advance to transmit the information related to the software update to the information terminal 95. In this case, Steps S602 and S604 may be omitted.

Figure 7:
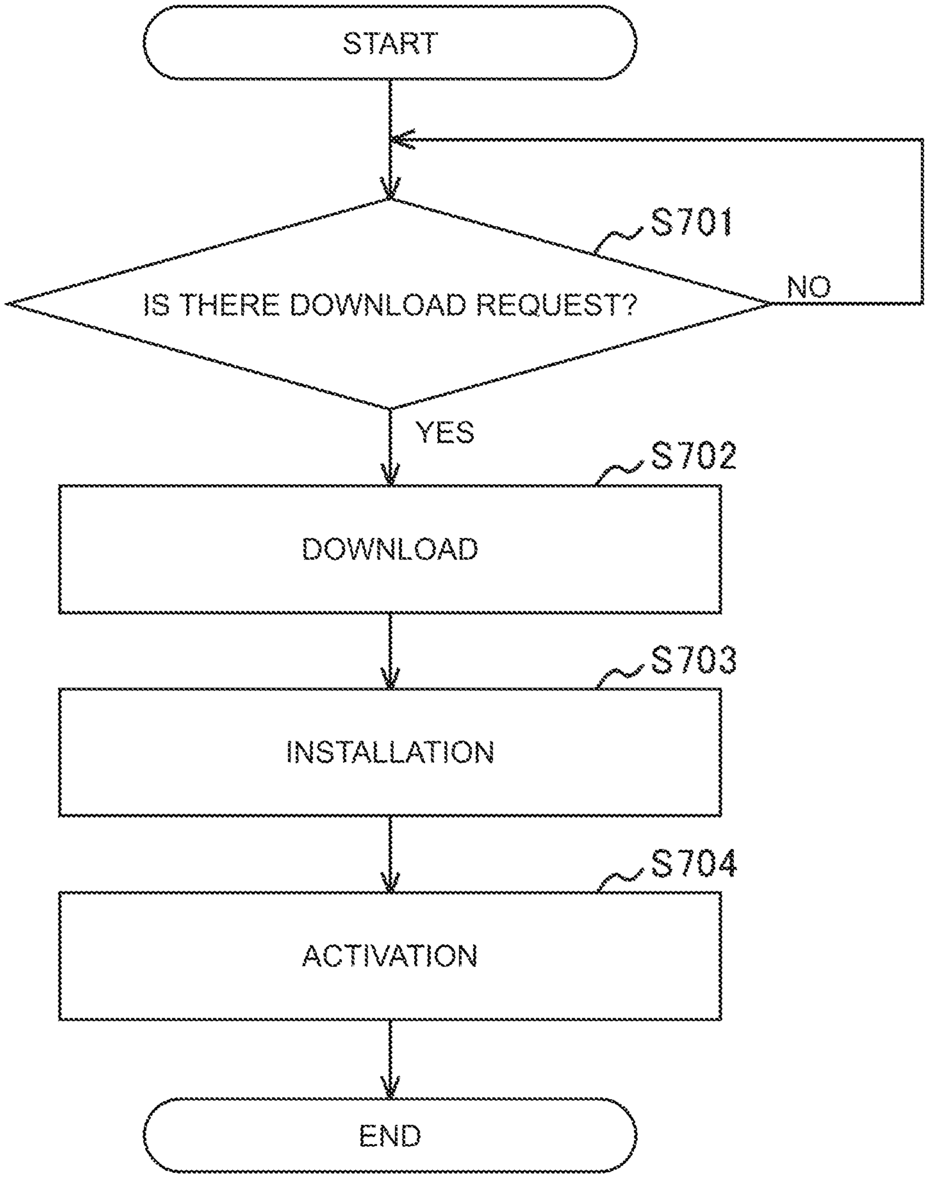
FIG. 7 is a flowchart illustrating an example of a software update control process to be executed by the center, the OTA master, and a target electronic control unit.

FIG. 7 is a flowchart illustrating an example of a software update control process to be executed by the center 10, the OTA master 30, and the target electronic control unit. FIG. 7 shows an example of a software update sequence after the process for transmitting the information related to the software update (FIGS. 6A and 6B) has been executed in the download phase to obtain download permission in the software update process.

The process for transmitting the information related to the software update (FIGS. 6A and 6B) may be executed not only in the download phase described in the present embodiment, but also in the installation phase to obtain installation permission in the software update process, or in the activation phase to obtain activation permission in the software update process.

Step S701

The center 10 determines whether there is a distribution package download request from the OTA master 30. When the center 10 determines that there is a download request (Step S701: YES), the process proceeds to Step S702. When the center 10 determines that there is no download request (Step S701: NO), the process repeats Step S701 (the center 10 waits for the download request).

Step S702

The OTA master 30 downloads update data. More specifically, the OTA master 30 receives a distribution package including the update data transmitted from the center 10. The OTA master 30 stores the received distribution package in the storage unit 37. When the update data is downloaded, the process proceeds to Step S703.

Step S703

The OTA master 30 executes software installation for the target electronic control unit based on the update data. More specifically, the OTA master 30 transfers the update data in the distribution package to the target electronic control unit based on the information in the distribution package. Then, the OTA master 30 gives an instruction to install update software. The installation is a process of writing the update data to the data storage area of the target electronic control unit. When the update software is installed, the process proceeds to Step S704.

Step S704

The OTA master 30 activates the update software installed in the target electronic control unit. More specifically, the OTA master 30 instructs the target electronic control unit that has written the update software to the data storage area to activate the update software based on the information in the distribution package. The target electronic control unit is restarted and activates the update software when a specific input operation such as powering OFF is performed. When the activation process for the update software is executed, the software update control process is terminated.

Operations and Effects

As described above, in the network system according to the embodiment of the present disclosure, when the information related to the software update is not sufficiently displayable on the display device 70 mounted on the vehicle at the time of updating the software of the electronic control unit mounted on the vehicle, the center 10 transmits the information related to the software update to the information terminal 95 associated with the vehicle by electronic mail or the like. Along with the transmission, the center 10 transmits, to the vehicle (OTA master 30), the notification that the information related to the software update has been transmitted to the information terminal 95. The vehicle causes the display device 70 to display the notification received from the center 10.

Through this process, the user or administrator of the vehicle can determine that the electronic mail or the like transmitted to his/her information terminal 95 is reliable information by viewing the contents displayed on the display device 70. Further, the user or administrator of the vehicle can be aware that the electronic mail has been transmitted to his/her information terminal 95. Therefore, it is possible to avoid the situation in which, when updating the software by using the OTA, the user or administrator of the vehicle is unaware of the information transmitted to the information terminal 95 of the user or administrator by electronic mail or the like or does not regard the information as necessary and reliable information. Further, it is possible to execute the process of updating the software of the target electronic control unit mounted on the vehicle after the user or administrator of the vehicle understands the details of the software update and determination is made that agreement is made for the update.

Although the embodiment of the technology of the present disclosure has been described above, the present disclosure can be understood not only as the system including the center and the vehicle and as the center but also as, for example, a method to be executed by a center including a processor and a memory, a program, a non-transitory computer-readable storage medium storing the program, an OTA master communicable with the center, or a vehicle including the OTA master. The center may include one or more processors. The OTA master may include one or more processors.

The technology of the present disclosure can be used in a network system for updating software of an electronic control unit mounted on a vehicle.

What is claimed is:

1. A system comprising:
- a vehicle including an electronic control unit;
- a center configured to control a software update for the electronic control unit; and
- an information terminal associated with the vehicle,
- wherein the vehicle includes:
  - a display device; and
  - one or more processors configured to communicate with the center, and wherein the center includes one or more processors configured to:
  - acquire, from the vehicle, information on the display device including information indicating whether or not update information related to the software update is displayable on the display device of the vehicle;

determine whether the update information related to the software update is displayable on the display device of the vehicle based on the information on the display device;

in response to determining that the update information is not displayable on the display device of the vehicle, transmit the update information to the information terminal for display on the information terminal;

in response to transmitting the update information to the information terminal, transmit, to the vehicle, a notification indicating that the update information has been transmitted from the center to the information terminal for display on the information terminal, wherein the notification is separate from and distinct from a general update availability notification;

cause the vehicle to display the notification on the display device, wherein the notification prompts a user or administrator to check the information terminal for the update information;

receive an update acceptance notification from the information terminal or the vehicle indicating that the user or administrator has approved the software update; and control a software update process for the electronic control unit based on the update acceptance notification, wherein the software update process includes downloading, installing, and activating the software update.

2. The system according to claim 1, wherein the vehicle further includes a switch configured to instruct the center to retransmit the update information to the information terminal.

3. The system according to claim 1, wherein:

the one or more processors of the vehicle are further configured to transmit device information related to the display device to the center; and the one or more processors of the center are further configured to acquire the device information from the vehicle.

4. A center configured to control a software update for an electronic control unit mounted on a vehicle, the center comprising:

one or more processors configured to:

acquire, from the vehicle, information on a display device including information indicating whether or not update information related to the software update is displayable on the display device of the vehicle;

determine whether the update information related to the software update is displayable on the display device of the vehicle based on the information on the display device;

in response to determining that the update information is not displayable on the display device of the vehicle, transmit the update information to an information terminal associated with the vehicle for display on the information terminal;

in response to transmitting the update information to the information terminal, transmit, to the vehicle, a notification indicating that the update information has been transmitted from the center to the information terminal for display on the information terminal, wherein the notification is separate from and distinct from a general update availability notification;

cause the vehicle to display the notification on the display device, wherein the notification prompts a user or administrator to check the information terminal for the update information;

receive an update acceptance notification from the information terminal or the vehicle indicating that the user or administrator has approved the software update; and control a software update process for the electronic control unit based on the update acceptance notification, wherein the software update process includes downloading, installing, and activating the software update.

5. The center according to claim 4, wherein the one or more processors are further configured to retransmit the update information to the information terminal when the one or more processors receive a retransmission request from the vehicle.

6. A method to be executed by a center configured to control a software update for an electronic control unit mounted on a vehicle, the center including one or more processors and a memory, the method comprising:

acquiring, from the vehicle, information on a display device including information indicating whether or not update information related to the software update is displayable on the display device of the vehicle;

determining whether the update information related to the software update is displayable on the display device of the vehicle based on the information on the display device;

in response to determining that the update information is not displayable on the display device of the vehicle, transmitting the update information to an information terminal associated with the vehicle for display on the information terminal;

in response to transmitting the update information to the information terminal, transmitting, to the vehicle, a notification indicating that the update information has been transmitted from the center to the information terminal for display on the information terminal. wherein the notification is separate from and distinct from a general update availability notification;

causing the vehicle to display the notification on the display device, wherein the notification prompts a user or administrator to check the information terminal for the update information;

receiving an update acceptance notification from the information terminal or the vehicle indicating that the user or administrator has approved the software update; and controlling a software update process for the electronic control unit based on the update acceptance notification, wherein the software update process includes downloading, installing, and activating the software update.

7. A non-transitory computer-readable storage medium storing instructions that are executable by one or more computers of a center and that cause the one or more computers to perform functions, the center including one or more processors and a memory, the center being configured to control a software update for an electronic control unit mounted on a vehicle, the functions comprising:

acquiring, from the vehicle, information on a display device including information indicating whether or not update information related to the software update is displayable on the display device of the vehicle;

determining whether the update information related to the software update is displayable on the display device of the vehicle based on the information on the display device;

in response to determining that the update information is not displayable on the display device of the vehicle, transmitting the update information to an information terminal associated with the vehicle for display on the information terminal;

in response to transmitting the update information to the information terminal, transmitting, to the vehicle, a notification indicating that the update information has been transmitted from the center to the information terminal for display on the information terminal, wherein the notification is separate from and distinct from a general update availability notification;

causing the vehicle to display the notification on the display device, wherein the notification prompts a user or administrator to check the information terminal for the update information;

receiving an update acceptance notification from the information terminal or the vehicle indicating that the user or administrator has approved the software update; and controlling a software update process for the electronic control unit based on the update acceptance notification, wherein the software update process includes downloading, installing, and activating the software update.

* * * * *